(12) United States Patent
Kunihiro et al.

(10) Patent No.: US 12,589,763 B2
(45) Date of Patent: Mar. 31, 2026

(54) INTERVENTION OPERATION DETERMINATION APPARATUS

(71) Applicant: TOYOTA JIDOSHA KABUSHIKI KAISHA, Toyota (JP)

(72) Inventors: Yoji Kunihiro, Susono (JP); Takahiro Kojo, Gotemba (JP); Yutaka Aoki, Mishima (JP); Go Inoue, Gotemba (JP); Yushi Shibaike, Susono (JP); Yushi Nagata, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 18/597,305

(22) Filed: Mar. 6, 2024

(65) Prior Publication Data

US 2024/0343260 A1     Oct. 17, 2024

(30) Foreign Application Priority Data

Apr. 17, 2023     (JP) .................................. 2023-067385

(51) Int. Cl.
| | |
|---|---|
| B60W 50/10 | (2012.01) |
| B60W 60/00 | (2020.01) |
| B62D 6/00 | (2006.01) |

(52) U.S. Cl.
CPC .......... B60W 50/10 (2013.01); B60W 60/001 (2020.02); B62D 6/00 (2013.01); B60W 2520/14 (2013.01); B60W 2540/18 (2013.01)

(58) Field of Classification Search
CPC ............... B60W 50/10; B60W 60/001; B60W 2520/14; B60W 2540/18; B60W 60/0051;
(Continued)

(56) References Cited

U.S. PATENT DOCUMENTS

| | | | |
|---|---|---|---|
| 6,598,699 B2 * | 7/2003 | Takehara | ............. B62D 5/0466 |
| | | | 180/443 |
| 9,105,190 B2 | 8/2015 | Akiyama | |

(Continued)

FOREIGN PATENT DOCUMENTS

| | | | | |
|---|---|---|---|---|
| CN | 111532269 A | * | 8/2020 | ............ B60W 50/08 |
| CN | 108430855 B | * | 12/2020 | ........... B62D 5/0463 |

(Continued)

OTHER PUBLICATIONS

CN-111532269-A translation (Year: 2020).*
(Continued)

*Primary Examiner* — Kyle T Johnson
(74) *Attorney, Agent, or Firm* — Sughrue Mion, PLLC

(57)     ABSTRACT

An intervention operation determination apparatus includes: a steering unit operated by a driver; a steering wheel to be turned in conjunction with the operation of the steering unit; and a detection unit that detects an operation amount of the steering unit when a steering force that turns the steering wheel is generated. The intervention operation determination apparatus determines that the driver has operated the steering unit during autonomous driving in which traveling by controlling an actuator without an operation of the steering unit by the driver is performed. The intervention operation determination apparatus further includes a controller that controls the actuator. The controller determines that there has been an intervention operation in which the driver operates the steering unit based on a deviation between a target steering angle in the autonomous driving and an actual steering angle based on an operation amount detected by the detection unit.

12 Claims, 14 Drawing Sheets

(58) Field of Classification Search
CPC ........ B62D 6/00; B62D 15/025; B62D 1/286;
B62D 5/046
See application file for complete search history.

(56)                References Cited

U.S. PATENT DOCUMENTS

| | | | |
|---|---|---|---|
| 9,393,960 B2 | 7/2016 | Kodaira | |
| 9,483,945 B2 | 11/2016 | Okita et al. | |
| 9,873,412 B2 | 1/2018 | Moriizumi | |
| 10,793,147 B2 | 10/2020 | Kaminade et al. | |
| 10,996,673 B1* | 5/2021 | Katzourakis | ........... G05D 1/021 |
| 11,130,494 B2* | 9/2021 | Ryne | ................. B60W 60/0053 |
| 11,358,630 B2* | 6/2022 | Kim | ........................ B62D 1/286 |
| 2010/0228417 A1* | 9/2010 | Lee | ...................... B62D 15/025 |
| | | | 701/23 |
| 2018/0201317 A1* | 7/2018 | Kudo | ................... B60W 10/20 |
| 2019/0202493 A1* | 7/2019 | Kawagoe | ............. B62D 15/025 |
| 2020/0324808 A1* | 10/2020 | Kodera | ................ B62D 5/0463 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2022/0258795 A1* | 8/2022 | Niwa | ...................... B62D 5/046 |
| 2024/0343260 A1* | 10/2024 | Kunihiro | ............. B60W 60/001 |
| 2024/0343302 A1* | 10/2024 | Kunihiro | ................ B62D 1/286 |

FOREIGN PATENT DOCUMENTS

| | | | | | |
|---|---|---|---|---|---|
| CN | 114620075 A | * | 6/2022 | ........... | B60W 50/14 |
| EP | 0771714 A2 | * | 5/1997 | ........... | B62D 15/025 |
| JP | 2001-39325 A | | 2/2001 | | |
| JP | 2004-331072 A | | 11/2004 | | |
| JP | 2018052271 A | * | 4/2018 | | |
| JP | 2019-14433 A | | 1/2019 | | |
| JP | 2020-40533 A | | 3/2020 | | |
| WO | WO-03076250 A1 | * | 9/2003 | ........... | B62D 15/025 |

OTHER PUBLICATIONS

CN-114620075-A translation (Year: 2022).*
JP-2018052271-A translation (Year: 2018).*
WO-03076250-A1 translation (Year: 2003).*
CN-108430855-B translation (Year: 2020).*

* cited by examiner

INTERVENTION OPERATION DETERMINATION APPARATUS

CROSS-REFERENCE TO RELATED APPLICATION

This application claims priority to Japanese Patent Application No. 2023-067385 filed on Apr. 17, 2023, incorporated herein by reference in its entirety.

BACKGROUND

1. Technical Field

The present disclosure relates to an intervention operation determination apparatus that determines that a driver has intervened and performed a steering operation while traveling by controlling a steering angle without the steering operation by the driver is being performed.

2. Description of Related Art

In Japanese Unexamined Patent Application Publication No. 2019-14433, a steering control apparatus configured to be able to perform switching to a control different from an autonomous driving control when there is a steering intervention by a driver while the autonomous driving control is being executed is described. In the autonomous driving control, a rudder angle of a vehicle is changed without a steering operation by the driver. The steering control apparatus is configured to determine whether there is a steering intervention by the driver based on a steering torque during the autonomous driving control. Specifically, the steering control apparatus stores therein a steering torque at a time point at which the change rate of the steering torque detected by a torque sensor becomes equal to or more than a predetermined change rate. Next, the steering control apparatus determines that there has been a steering intervention by the driver when a torque equal to or more than the stored steering torque is continuously detected for a predetermined amount of time. Conversely, when the torque decreases to a torque less than the stored steering torque within a predetermined amount of time, the steering control apparatus determines that the detection value of the torque sensor has changed due to external disturbance and has not changed due to the steering intervention by the driver.

In Japanese Unexamined Patent Application Publication No. 2020-40533, a travel control apparatus configured to perform switching to a normal control that changes a steering angle of a vehicle based on a steering operation by a driver when the movement of hands or eyes of the driver is detected by a camera provided in the vehicle and the driver is trying to maintain steering based on the detection result thereof at the time of execution of an autonomous driving control that changes the steering angle of the vehicle without the steering operation of the driver is described.

SUMMARY

According to the steering control apparatus described in Japanese Unexamined Patent Application Publication No. 2019-14433, it is determined that there has been a steering intervention by the driver at a time point at which a predetermined amount of time has elapsed from when the change rate of the steering torque has become equal to or more than a predetermined change rate. In other words, the control before the steering operation is continued for a period from when the driver actually performs a steering operation to when it is determined that there has been a steering intervention. The autonomous driving control is normally not configured to perform a control corresponding to the steering operation by the driver. Therefore, when the driver performs a steering operation and the rudder angle changes, it is determined that a traveling course has changed due to some factor, a target steering angle to return to the formal traveling course is obtained, and an output torque of an actuator is controlled by considering the target steering angle to be a target value. The output torque of the actuator as above becomes greater as a deviation between the current steering angle and the target steering angle becomes greater. Therefore, there is a possibility that the output torque of the actuator become greater in accordance with the steering operation amount, the operation feeling decrease, or the driver feel uncomfortable for a period from when the driver has actually performed a steering operation to when the steering intervention is determined.

According to the travel control apparatus described in Japanese Unexamined Patent Application Publication No. 2020-40533, it is determined that the driver is trying to maintain steering based on the movement of the hands and eyes of the driver, and the autonomous driving control is switched to the normal control based on the determination result thereof. However, there is a possibility of the driver not maintaining the steering or a possibility of the driver not actually performing a steering operation even when the steering is maintained. In such case, the autonomous driving control is caused to return again after switching to the normal control is performed. Therefore, not only does the control become complicated but a period of time in which the vehicle cannot be controlled also temporarily occurs. As a result, the driver needs to control the vehicle, and it may feel cumbersome.

The present disclosure has been made in view of the technical problems described above, and an object thereof is to provide an intervention operation determination apparatus capable of accurately determining an intervention operation of steering by a driver in an early stage when a steering angle of a vehicle is controlled without an operation by the driver.

In order to achieve the object described above, the present disclosure is an intervention operation determination apparatus including: a steering unit operated by a driver; a steering wheel to be turned in conjunction with the operation of the steering unit; an actuator that generates a steering force that turns the steering wheel; and a detection unit that detects an operation amount of the steering unit. The intervention operation determination apparatus determines that the driver has operated the steering unit during autonomous driving in which traveling by controlling the actuator without an operation of the steering unit by the driver is performed. The intervention operation determination apparatus further includes a controller that controls the actuator. In the intervention operation determination apparatus, the controller determines that there has been an intervention operation in which the driver operates the steering unit based on a deviation between a target steering angle in the autonomous driving and an actual steering angle based on an operation amount detected by the detection unit.

In the present disclosure, the controller may determine that there has been the intervention operation when an absolute value of the deviation is equal to or more than a predetermined value.

In the present disclosure, the controller may determine that there has been the intervention operation when a direction of the target steering angle with respect to a reference position and a direction of the actual steering angle with respect to the reference position are opposite directions.

In the present disclosure, the controller may determine that there has been the intervention operation when a change rate of the deviation is equal to or more than a predetermined change rate.

The present disclosure is an intervention operation determination apparatus including: a steering unit operated by a driver; a steering wheel to be turned in conjunction with the operation of the steering unit; and an actuator that generates a steering force that turns the steering wheel. The intervention operation determination apparatus determines that the driver has operated the steering unit during autonomous driving in which traveling by controlling the actuator without an operation of the steering unit by the driver is performed. The intervention operation determination apparatus further includes a controller that controls the actuator. In the intervention operation determination apparatus, the controller determines that there has been an intervention operation in which the steering unit is operated based on a deviation between a target lateral position in the autonomous driving and an actual lateral position.

In the present disclosure, the controller may determine that there has been the intervention operation when an absolute value of the deviation is equal to or more than a predetermined value.

In the present disclosure, the controller may determine that there has been an intervention operation when a direction of a yaw angle with respect to a reference position based on the target lateral position and a direction of an actual yaw angle with respect to the reference position are opposite directions.

In the present disclosure, the controller may determine that there has been the intervention operation when a change rate of the deviation is equal to or more than a predetermined change rate.

In the present disclosure, it is determined that there has been an intervention operation in which the driver operates the steering unit based on a deviation between a target steering angle in the autonomous driving and an actual steering angle based on an operation amount detected by the detection unit. Therefore, it becomes possible to determine an intervention operation before the steering force output from the actuator in order to cause the actual steering angle to follow the target steering angle becomes greater. As a result, it becomes possible to reduce cases in which the steering force in accordance with the target steering angle acts against the steering force of the steering unit by the driver, improve the feeling of the steering unit by the driver, and reduce cases in which the driver feels uncomfortable.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a block line diagram showing one example of a configuration that determines an intervention operation based on the deviation between the actual operation angle and the target steering angle and directions of the target steering angle and the actual steering angle;

FIG. 9 is a block line diagram showing one example of a configuration that determines an intervention operation based on a change rate of the deviation between the actual operation angle and the target steering angle;

DETAILED DESCRIPTION OF EMBODIMENTS

An embodiment of the present disclosure is described below with reference to the drawings. The embodiment described below is merely one example when the present disclosure is carried out and does not limit the present disclosure.

Figure 1:
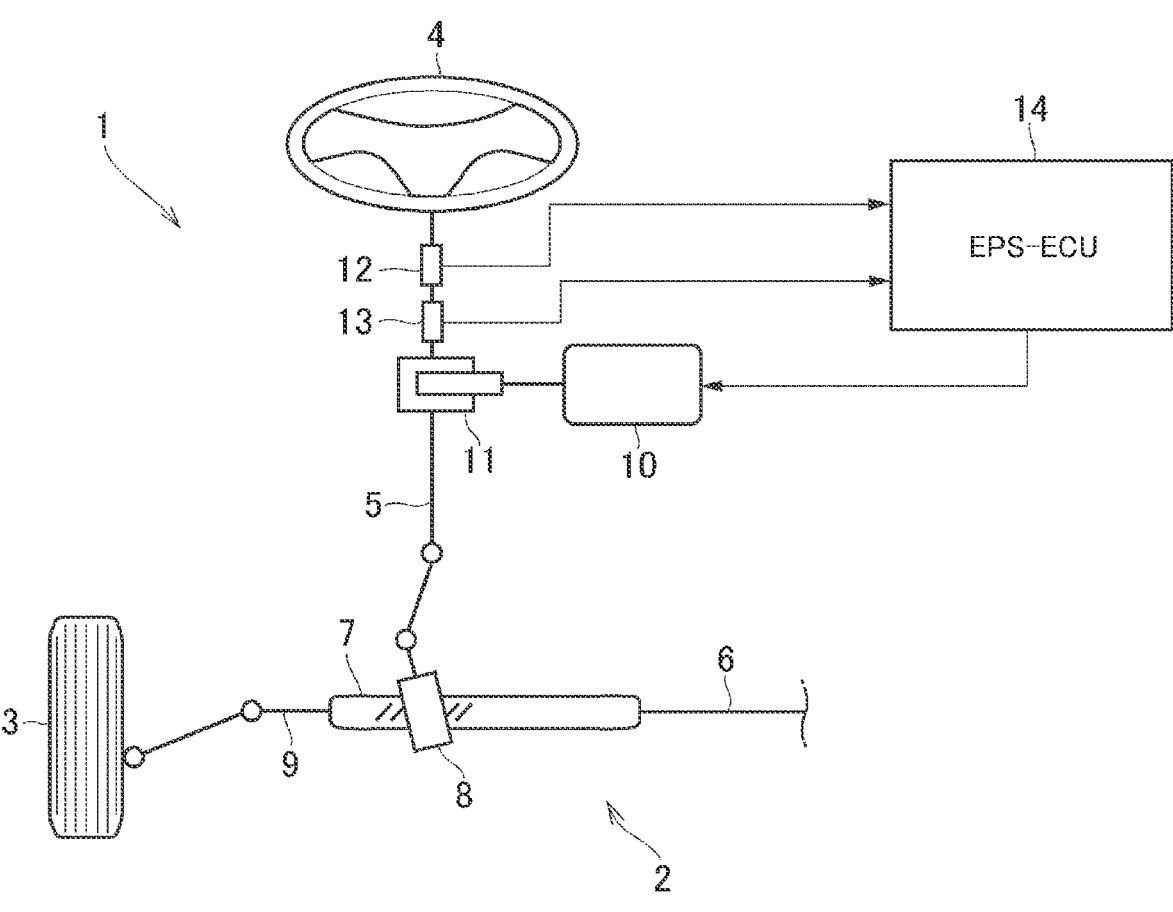
FIG. 1 is a schematic view for describing one example of an electric power steering apparatus that can become the subject matter in the present disclosure.

The target of an intervention operation determination apparatus in the embodiment of the present disclosure is a vehicle capable of performing autonomous driving traveling by controlling a steering angle without a steering operation by a driver. One example of a steering apparatus capable of autonomously controlling the steering angle as above is shown in FIG. 1. The steering apparatus shown in FIG. 1 is an electric power steering apparatus (EPS) 1 configured to be able to electrically control a torque for changing the steering angle (hereinafter referred to as a steering torque) and able to control an assist torque that adjusts the steering torque of the driver, and a fundamental configuration thereof is schematically shown.

The EPS 1 is mounted on a vehicle 2 and is configured to turn a steering wheel 3 such as a front wheel that changes the orientation (performs veering) of the vehicle 2. A steering wheel 4 is provided as a steering unit that performs the operation. The steering wheel 4 is joined to a steering linkage 6 via a steering shaft 5 and is configured to turn the steering wheel 3 in accordance with a rotation angle of the steering wheel 4. As one example, the steering linkage 6 has a rack 7 that moves back and forth in the width direction of the vehicle 2, a pinion 8 engaged with the rack 7, and a tie rod 9 that joins the rack 7 and the steering wheel 3 to each other, and the steering shaft 5 is joined to the pinion 8. Therefore, when the steering wheel 4 is rotated in the right direction or the left direction, the pinion 8 rotates, the rack 7 moves in the right direction or the left direction, and the steering wheel 3 accordingly turns. In other words, the steering wheel 3 turns in conjunction with the operation of the steering wheel 4.

In the embodiment described here, the operation amount of the steering wheel 4 that causes the vehicle 2 to advance straight is a state in which the steering angle is "0 degrees", the steering amount measured to the left direction from here is a "positive" steering angle, and the steering amount measured to the right direction is a "negative" steering amount. Therefore, the steering angle increases by operating the steering wheel 4 so as to veer the vehicle 2 in the left direction. Meanwhile, the steering angle decreases by operating the steering wheel 4 so as to veer the vehicle 2 in the right direction.

A motor 10 for generating a steering torque and assisting a steering torque by the driver is provided. The motor 10 is configured so as to adjust the torque with respect to the steering wheel 4 and the steering shaft 5 or adjust the back and forth motive power with respect to the rack 7, in other words, generate a steering force that turns the steering wheel 3. In the example shown in FIG. 1, the motor 10 is joined to the steering shaft 5 via a decelerator 11. The motor 10 is equivalent to an "actuator" in the embodiment of the present disclosure.

A torque sensor 12 that detects a torque that acts on the steering shaft 5, a rudder angle sensor 13 for detecting a steering angle (operation amount) that is a rotation angle of the steering shaft 5, and the like are provided, and those sensors 12, 13 input detection signals to an electronic control apparatus (EPS-ECU) 14 for the electric power steering apparatus (EPS). The rudder angle sensor 13 is equivalent to a "detection unit" in the embodiment of the present disclosure, and the EPS-ECU 14 is equivalent to a "controller" in the embodiment of the present disclosure.

Figure 2:
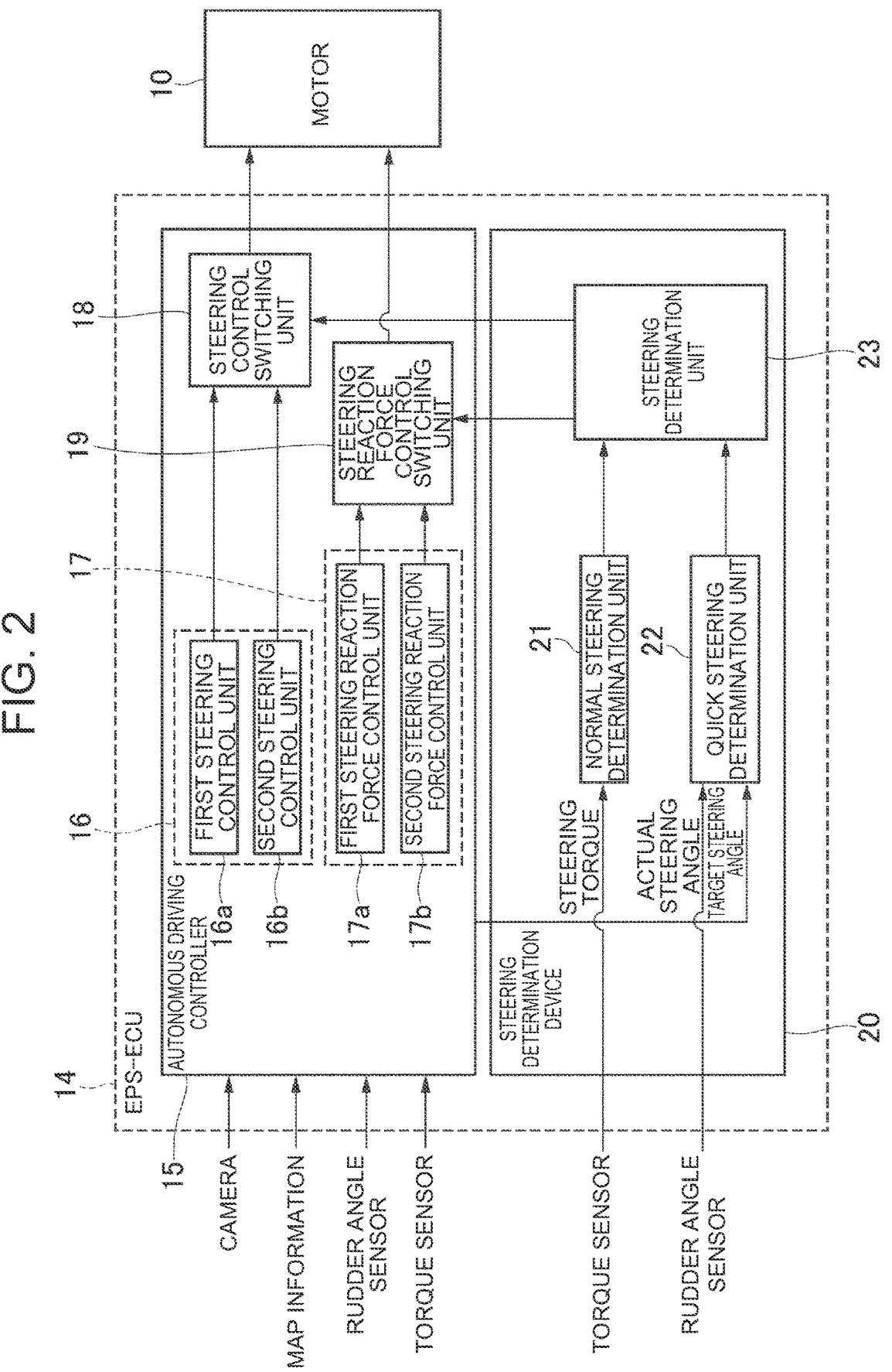
FIG. 2 is a block diagram for describing a configuration of an EPS-ECU.

FIG. 2 shows a block diagram for describing a configuration of the EPS-ECU 14. The EPS-ECU 14 shown in FIG. 2 is configured with a microcomputer serving as the main body and is configured to define a command signal to be output to the motor 10 based on input signals and arithmetic expressions, a map, and the like stored in advance.

The EPS-ECU 14 is configured to be able to control the motor 10 without the operation of the steering wheel 4 by the driver and perform autonomous driving traveling that performs traveling by following a traveling route (including a position within a traveling lane) set in advance. The EPS-ECU 14 is configured to be able to set, in addition to a mode that performs autonomous driving traveling in which the driver does not operate the steering wheel 4 (hereinafter referred to as a first mode), a mode configured to enable the driver to operate, as appropriate, the steering wheel 4 at the time of autonomous driving traveling (hereinafter referred to as a second mode). In other words, the second mode is configured to prioritize the will of the driver when the driver operates the steering wheel 4 at the time of autonomous driving traveling and autonomously control the steering angle so as to follow the traveling route when the steering wheel 4 is not operated. The first mode and the second mode are configured to be selectable, as appropriate, by the driver by operating an operation unit such as a switch (not shown) provided in the vehicle 2, for example.

In the example shown in FIG. 2, an autonomous driving controller 15 that controls an output torque of the motor 10 for performing the autonomous driving traveling as above is provided in the EPS-ECU 14. In the autonomous driving controller 15, a steering control unit 16 that calculates a torque for controlling the steering angle of the vehicle 2 without the operation of the steering wheel 4 by the driver is provided. The steering control unit 16 is configured to successively calculate a steering torque for causing the vehicle 2 to travel along the traveling route, for example. Therefore, signals are input to the autonomous driving controller 15 shown in FIG. 2 from a camera or a sensor that specifies current position information or peripheral information such as map information. The steering control unit 16 is configured to obtain a misalignment amount between the current position of the vehicle 2 specified based on the camera, the map information, and the like and a traveling route formed in advance, calculate a target steering angle $\theta t$ for correcting the misalignment amount, and calculate a target steering torque from a deviation $\Delta\theta$ between the target steering angle $\theta t$ and an actual steering angle $\theta r$ detected by the rudder angle sensor 13, for example.

A misalignment between the traveling route and the current position of the vehicle 2 as described above occurs by external factors of the vehicle 2 such as wind force received by the vehicle 2 and the road surface situation, internal factors due to the rotation of the steering wheel 4, and the like.

The steering control unit 16 includes a first steering control unit 16a that calculates a target steering torque when the first mode is selected and a second steering control unit 16b that calculates a target steering torque when the second mode is selected, and a feedback gain by which the deviation $\Delta\theta$ between the target steering angle $\theta t$ and the actual steering angle $\theta r$ is multiplied to calculate the target steering torque is set to be greater for the first steering control unit 16a than for the second steering control unit 16b. In other words, when the target steering torque is defined by the first steering control unit 16a, the vehicle 2 can be returned to the traveling route in a quicker manner as compared to when the target steering torque is defined by the second steering control unit 16b.

In the autonomous driving controller 15, a steering reaction force control unit 17 for calculating a reaction torque against the steering torque when the steering wheel 4 is operated is further provided. The steering reaction force control unit 17 is configured to calculate a reaction torque by multiplying a torque value detected by the torque sensor 12 by a predetermined gain. There are cases in which the driver inadvertently operates the steering wheel 4 and cases in which the driver intentionally operates the steering wheel 4 at the time of autonomous driving traveling, and the reaction torque is calculated to set an operation feeling and the like of the steering wheel 4 in response to such situations.

The steering reaction force control unit 17 includes a first steering reaction force control unit 17a that calculates a reaction torque when the first mode is selected and a second steering reaction force control unit 17b that calculates a reaction torque when the second mode is selected, and a gain by which the steering torque detected by the torque sensor 12 is multiplied to calculate the reaction torque is set to be greater for the first steering reaction force control unit 17a than for the second steering reaction force control unit 17b. In other words, the first steering reaction force control unit 17a sets the gain such that the assist torque becomes smaller than that of the second steering reaction force control unit 17b. Therefore, when the reaction torque is defined by the first steering reaction force control unit 17a, the torque necessary to rotate the steering wheel 4 becomes greater than when the reaction torque is defined by the second steering reaction force control unit 17b.

The autonomous driving controller 15 shown in FIG. 2 is configured to select the control units 16a, 16b for obtaining the target steering torque in accordance with the set control mode out of the first mode and the second mode and similarly select the control units 17a, 17b for obtaining the reaction torque in accordance with the set control mode. The autonomous driving controller 15 is configured to obtain the target steering torque by the second steering control unit 16b and obtain the reaction torque by the second steering reaction force control unit 17b when a signal indicating that there has been an operation of the steering wheel 4 is received by the steering determination unit 23 described below when the first mode is set. A steering control switching unit 18 that switches the control unit for obtaining the target steering torque, and a steering reaction force control switching unit 19 that switches the control unit for obtaining the reaction torque as above are provided in the autonomous driving controller 15.

The autonomous driving controller 15 is configured to add the target steering torque obtained by the steering control unit 16 and the reaction torque obtained by the steering reaction force control unit 17 together and output an electric signal for generating the added torque to the motor 10.

The EPS-ECU 14 includes a steering determination device 20 for determining that the driver has operated the steering wheel 4 during autonomous driving traveling. The steering determination device 20 includes a normal steering determination unit 21 that determines an intervention operation when the steering wheel 4 is operated at a relatively low speed, and a quick steering determination unit 22 that determines an intervention operation when the steering wheel 4 is operated at a relatively high speed.

The normal steering determination unit 21 is configured to determine whether there has been a steering operation in accordance with the steering torque detected by the torque sensor 12. Specifically, the normal steering determination unit 21 is configured to obtain a deviation between a minimum value and a maximum value of the steering torque detected by the torque sensor 12 within a predetermined amount of time and determine that there has been a steering operation when the deviation becomes equal to or more than a threshold value torque set in advance. This is because, when the driver operates the steering wheel 4 when traveling by outputting a motor torque calculated by the autonomous driving controller 15 is performed, a torque in a direction against the motor torque or equal to or more than the motor torque acts on the steering wheel 4 and is detected by the torque sensor 12 as a reaction torque.

The normal steering determination unit 21 determines the steering operation by the driver from the detection value of the torque sensor 12 in a predetermined amount of time, and hence an unavoidable delay occurs until the determination is established. Therefore, in the steering determination device 20 shown in FIG. 2, the quick steering determination unit 22 for determining the intervention operation in an early stage when the steering wheel 4 is operated at a high speed is provided.

Figure 3:
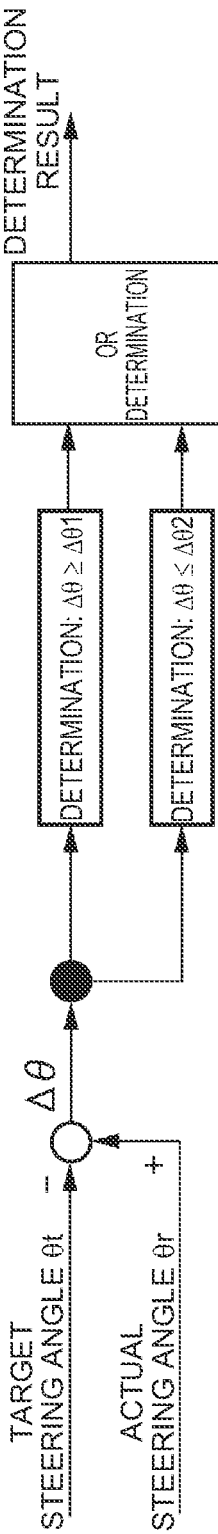
FIG. 3 is a block line diagram showing one example of a configuration that determines an intervention operation based on a deviation between an actual operation angle and a target steering angle.

The signals of the actual steering angle $\theta r$ that is the detection value of the rudder angle sensor 13 and the target steering angle $\theta t$ calculated by the autonomous driving controller 15 are input to the quick steering determination unit 22, and the quick steering determination unit 22 is configured to determine that the driver has performed a steering operation based on the actual steering angle $\theta r$ and the target steering angle $\theta t$. As one example thereof, as shown in FIG. 3, the quick steering determination unit 22 is configured to obtain the deviation $\Delta\theta$ by subtracting the target steering angle $\theta t$ from the actual steering angle $\theta r$, determine whether the deviation $\Delta\theta$ is equal to or more than a predetermined difference $\Delta\theta 1$ or is equal to or less than a predetermined difference $\Delta\theta 2$ set in advance, and determine that the driver has performed a steering operation when a positive determination is made in either one of the determinations. In other words, the quick steering determination unit 22 is configured to determine that the driver has performed a steering operation when an absolute value of the deviation between the target steering angle $\theta t$ and the actual steering angle $\theta r$ is equal to or more than a predetermined difference. The angle obtained by steering the steering wheel 4 in the left direction is "positive" as described above, and hence the deviation $\Delta\theta$ is either a positive value or a negative value. Therefore, in the determination described above, the predetermined difference $\Delta\theta 1$ is set to be a positive value, and the predetermined difference $\Delta\theta 2$ is set to be a negative value.

The signals determined by the normal steering determination unit 21 and the quick steering determination unit 22 are input to the steering determination unit 23, and a signal indicating whether it is determined that the driver has performed a steering operation by at least one of the determination units 21, 22 is input to the steering control switching unit 18 and the steering reaction force control switching unit 19. Therefore, the motor torque is determined as a result of controlling the steering control switching unit 18 and the steering reaction force control switching unit 19 based on the input signal.

Figure 4:
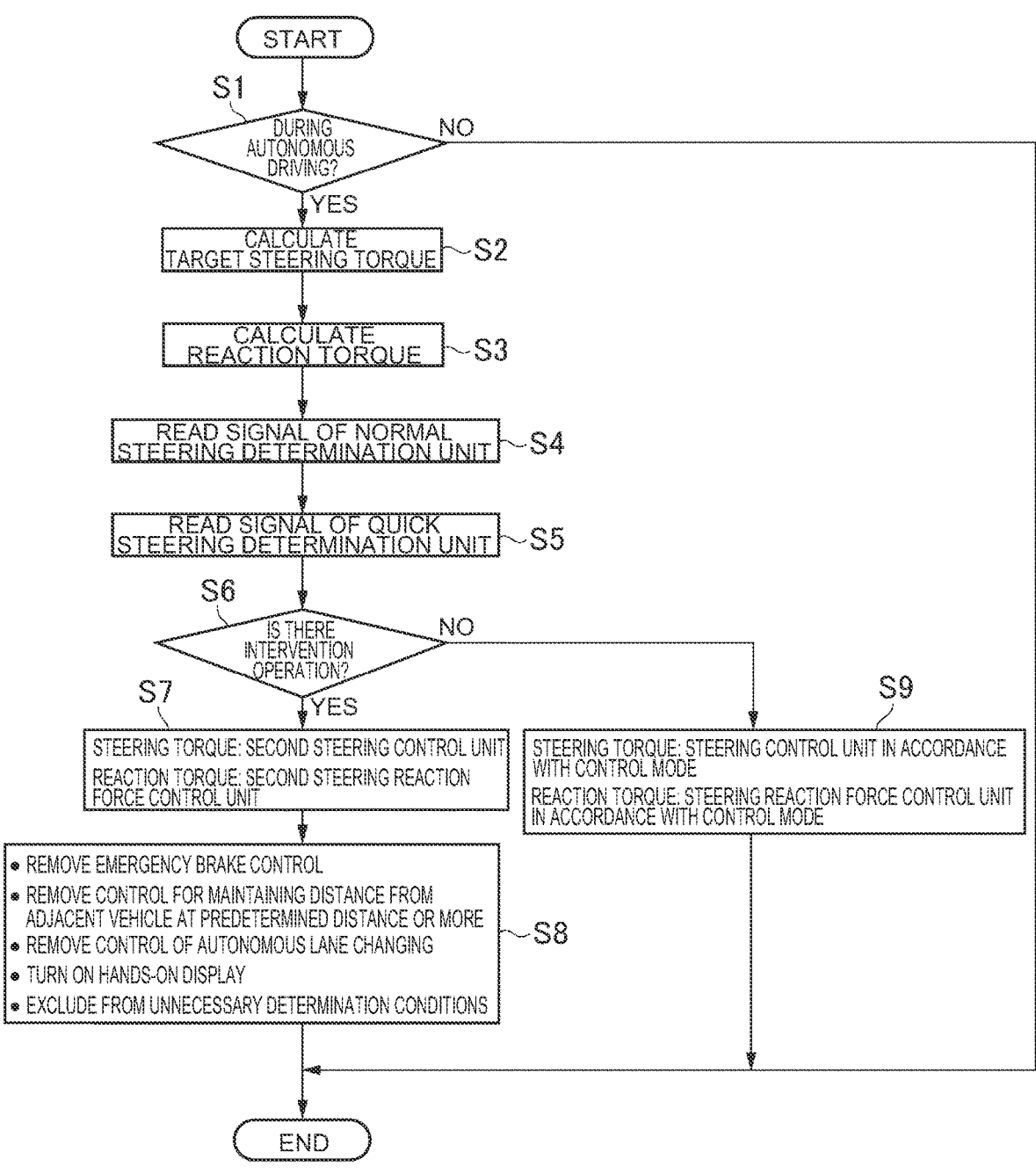
FIG. 4 is a flowchart for describing one example of a control executed by an intervention operation determination apparatus in an embodiment of the present disclosure.

FIG. 4 is a flowchart for describing one example of a control executed by the EPS-ECU 14. In the example shown in FIG. 4, first, it is determined whether the autonomous driving is being performed (Step S1). The intervention operation determination apparatus in the embodiment of the present disclosure determines that the driver has performed an intervention operation during autonomous driving, and hence the routine is directly ended in a temporal manner when a negative determination is made in Step S1 as a result of the autonomous driving not being performed.

Conversely, when a positive determination is made in Step S1 due to the autonomous driving being performed, the target steering torque is calculated by the first steering control unit 16a or the second steering control unit 16b based on the selected control mode (Step S2), and the reaction torque is calculated by the first steering reaction force control unit 17a or the second steering reaction force control unit 17b (Step S3).

Next, a signal that determines whether there has been an intervention operation by the driver is read. Specifically, first, a signal regarding whether there is an intervention operation is read from the normal steering determination unit 21 (Step S4), and a signal regarding whether there is an intervention operation is read from the quick steering determination unit 22 (Step S5).

Then, it is determined whether there has been an intervention operation (Step S6). In other words, it is determined whether the signal indicating that there has been an intervention operation is input to the steering determination unit 23 from at least either of the normal steering determination unit 21 or the quick steering determination unit 22.

When a positive determination is made in Step S6 as a result of an intervention operation being performed, a torque obtained by adding the steering torque obtained by the second steering control unit 16b and the reaction torque obtained by the second steering reaction force control unit 17b together is output as a command signal to the motor 10 (Step S7). In other words, the following occurs when the first mode is set. When the driver operates the steering wheel 4 to emergently avoid an obstacle, for example, the steering torque obtained by the first steering control unit 16a is switched to the steering torque obtained by the second steering control unit 16b, and the reaction torque obtained by the first steering reaction force control unit 17a is switched to the reaction torque obtained by the second steering reaction force control unit 17b. In other words, when the first mode is set, the control mode is switched to the second mode when there is an intervention operation.

Unnecessary controls are removed while travelling is performed by the operation of the steering wheel 4 by the driver (Step S8). Specifically, an emergency brake control, a control for maintaining the distance from an adjacent vehicle at a predetermined distance or more, and a control of autonomously changing the traveling lane are removed. Hands-on display is switched on to give the driver a notification indicating that travelling in accordance with the operation of the steering wheel 4 by the driver is to be performed or prompt the driver to travel in accordance with the operation of the steering wheel 4 by the driver. The EPS-ECU 14 is configured to determine malfunctions based on the deviation between the indicated value and the actual measurement value and the like and improve controllability when the autonomous driving traveling is performed without the operation of the steering wheel 4 by the driver. In other words, the EPS-ECU 14 is configured to perform a learning control based on the deviation between the indicated value and the actual measurement value and the like. Therefore, when the driver operates the steering wheel 4, the steering angle is changed by the operation by the driver, and hence the steering angle is excluded from conditions for determining malfunctions.

Meanwhile, when a negative determination is made in Step S5 as a result of the intervention operation not being performed, a torque obtained by adding together the steering torque obtained by the first steering control unit 16a or the second steering control unit 16b and the reaction torque obtained by the first steering reaction force control unit 17a or the second steering reaction force control unit 17b based on the set control mode is output to the motor 10 as a command signal (Step S9), and the routine is temporarily ended. In other words, a torque obtained by adding the motor torque calculated by the first steering control unit 16a and the reaction torque calculated by the first steering reaction force control unit 17a together is output as a command signal of the motor 10 when the first mode is selected, and a torque obtained by adding the motor torque calculated by the second steering control unit 16b and the reaction torque calculated by the second steering reaction force control unit 17b together is output as a command signal of the motor 10 when the second mode is selected.

Figure 5:
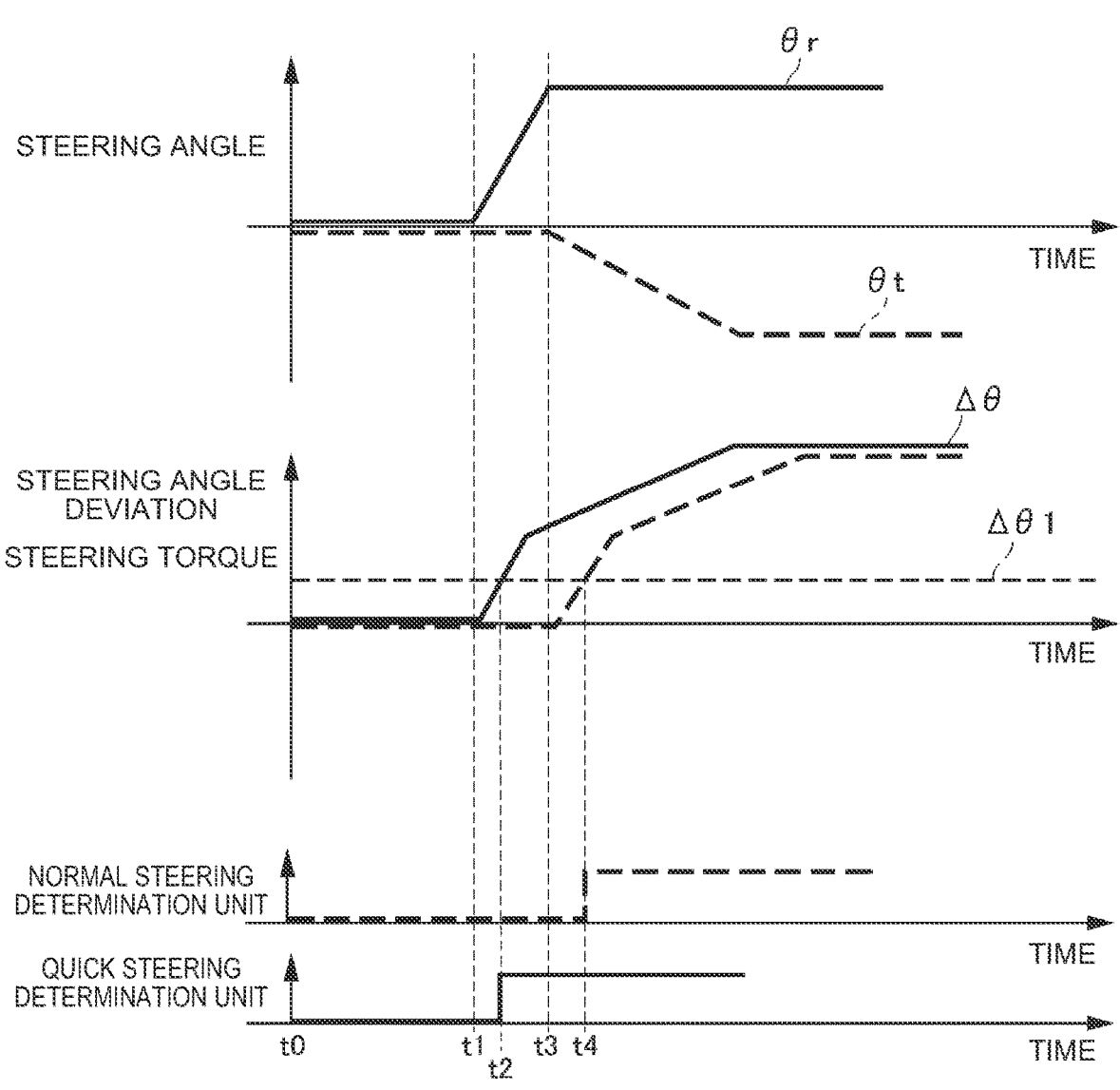
FIG. 5 is a time chart showing changes in an actual steering angle, a target steering angle, a steering angle deviation, a steering torque, whether there is determination by a normal steering determination unit, and whether there is determination by a quick steering determination unit in a case in which a steering wheel is operated in a left turning direction at the time of straight traveling by autonomous driving.

FIG. 5 shows a time chart for describing determination timings of the intervention operation for the normal steering determination unit 21 and the quick steering determination unit 22 when the driver operates the steering wheel 4 in a counterclockwise manner when traveling by advancing straight is performed without the operation of the steering wheel 4 by the driver. In the example shown in FIG. 5, at a time point t0, the actual steering angle θr (solid line) and the target steering angle θt (broken line) are "0" which is a reference value. At a time point t1, the driver starts operating the steering wheel 4, and the actual steering angle θr and the deviation Δθ (actual line) accordingly start to increase. As a result, the deviation Δθ becomes equal to or more than the predetermined difference Δθ1 (determination threshold value) at a time point t2, and hence it is determined that there has been an intervention operation by the quick steering determination unit 22.

Therefore, the steering torque is defined by the second steering control unit 16b, and the reaction torque is defined by the second steering reaction force control unit 17b at the time point t2. As described above, the gain by which the deviation between the target steering angle θt and the actual steering angle θr is multiplied is set to be smaller for the second steering control unit 16b than for the first steering control unit 16a. Similarly, the gain by which the steering torque is multiplied is set to be smaller for the second steering reaction force control unit 17b than for the first steering reaction force control unit 17a. Therefore, at the time point t2, a torque necessary for the driver to rotate the steering wheel 4 becomes smaller as compared to a case in which the steering torque or the reaction torque is defined by the first steering control unit 16a or the first steering reaction force control unit 17a. As a result, the load on the driver when the steering wheel 4 is operated becomes smaller, and hence the operation feeling can be improved. For example, the driver can fine-adjust the rotation angle of the steering wheel 4.

Meanwhile, at the time point t2, the target steering angle θt is not changed from the time point t0 as a result of the misalignment amount between the traveling route set in advance and the position of the actual vehicle 2 being small, for example. Therefore, the steering torque obtained by the first steering control unit 16a is maintained at a small value. As a result, an intervention operation is not determined by the normal steering determination unit 21. Therefore, when the quick steering determination unit 22 is not included, the steering torque and the reaction torque continued to be defined by the first steering control unit 16*a* and the first steering reaction force control unit 17*a* at the time point t2 and thereafter. Then, at a time point t3, the position of the vehicle 2 becomes misaligned from the traveling route, and hence the target steering angle θt is output in the negative direction (right turning direction), and the steering torque (broken line) starts to increase accordingly. In this case, the steering torque is in a direction opposite from the direction in which the driver rotates the steering wheel 4, and hence the torque value detected by the torque sensor 12 starts to increase. Then, the operation direction of the steering wheel 4 operated by the driver and the direction of the steering torque output from the motor 10 in order to follow the target steering angle θt become opposite from each other, and the steering torque becomes greater in accordance with the increase of the deviation Δθ of the steering angle. Therefore, a torque necessary for the driver to rotate the steering wheel 4 increases from the time point t3.

When the steering torque increases as above, the normal steering determination unit 21 can determine an intervention operation at a time point t4, and hence the steering torque is defined by the second steering control unit 16*b*, and the reaction torque is defined by the second steering reaction force control unit 17*b*. In FIG. 5, for convenience, the deviation Δθ of the steering angle and the magnitude of the steering torque are shown in the same section, and the scale is adjusted such that the predetermined difference Δθ1 at which it is determined that there has been an intervention operation by the quick steering determination unit 22 and a threshold value at which it is determined that there has been an intervention operation by the normal steering determination unit 21 are in the same position in FIG. 5.

As shown in FIG. 5, at the time of autonomous driving, an intervention operation can be determined by the quick steering determination unit 22 in an earlier stage than the normal steering determination unit 21 when the steering wheel 4 is operated such that the deviation Δθ between the target steering angle θt and the actual steering angle θr exceeds the predetermined difference Δθ1 before the position of the vehicle 2 is misaligned to a degree by which the misalignment amount between the traveling route and the position of the vehicle 2 is corrected. As a result, cases in which a great motor torque acts against the steering torque of the steering wheel 4 by the driver can be reduced, the operation feeling of the steering wheel 4 by the driver can be improved, and cases in which the driver feels uncomfortable can be reduced.

Figure 6:
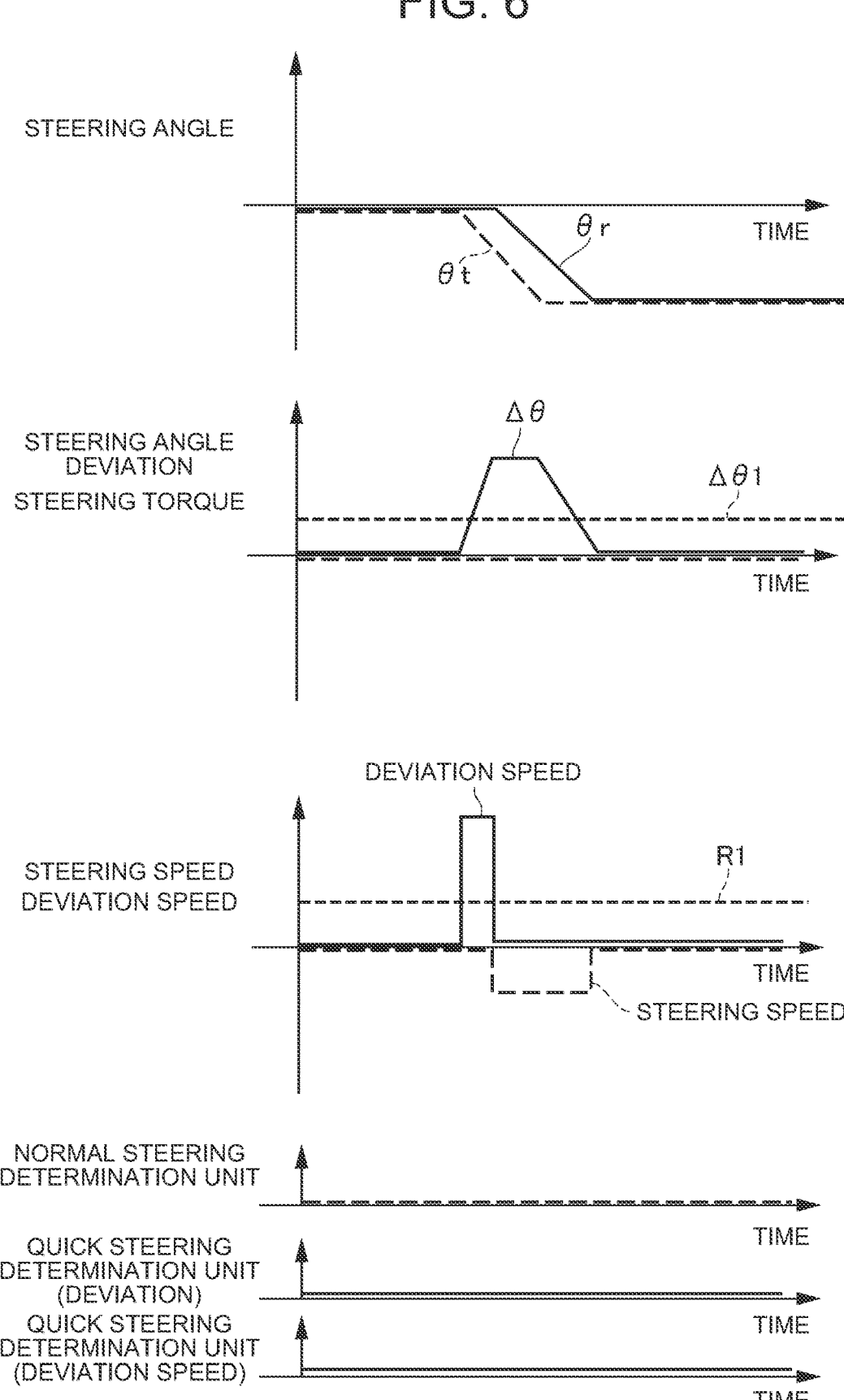
FIG. 6 is a time chart showing changes in the actual steering angle, the target steering angle, the steering angle deviation, the steering torque, a steering speed, a deviation speed, whether there is determination by the normal steering determination unit, whether there is determination by the quick steering determination unit based on the deviation, and whether there is determination by the quick steering determination unit based on the deviation speed in a case in which the target steering angle has changed in the left turning direction at the time of straight traveling by autonomous driving.
Figure 7:
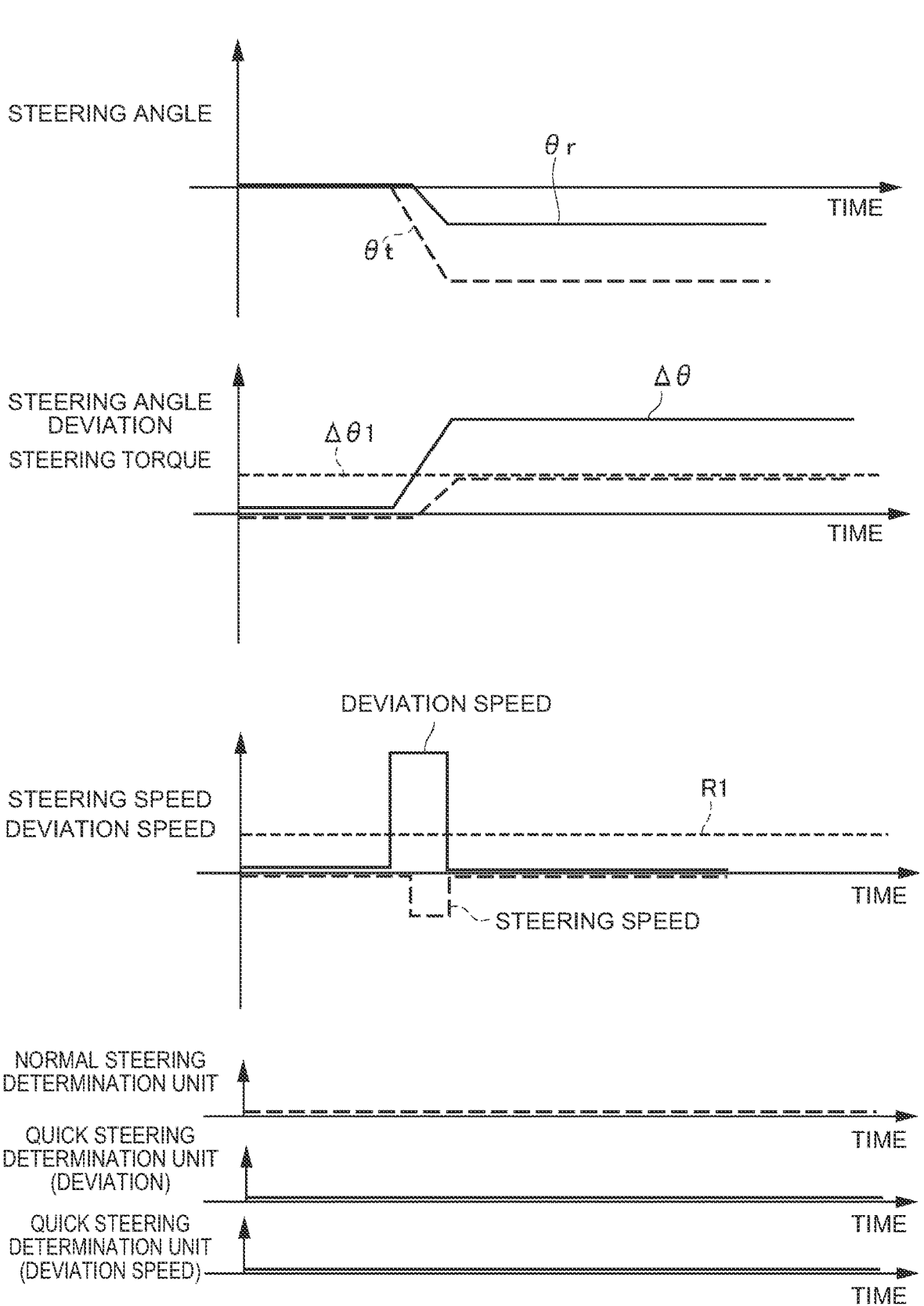
FIG. 7 is a time chart showing changes in the actual steering angle, the target steering angle, the steering angle deviation, the steering torque, the steering speed, the deviation speed, whether there is determination by the normal steering determination unit, whether there is determination by the quick steering determination unit based on the deviation, and whether there is determination by the quick steering determination unit based on the deviation speed in a case in which the target steering angle has changed in the left turning direction at the time of straight traveling by autonomous driving and the steering wheel is maintained.

When an intervention operation is determined in accordance with only the deviation Δθ between the actual steering angle θr and the target steering angle θt as described above, there is a possibility that the deviation Δθ become equal to or more than the predetermined difference Δθ1 or become equal to or less than the predetermined difference Δθ2 when the target steering angle θt rapidly changes as shown in FIG. 6 in order to avoid an obstacle, for example, at the time of autonomous driving traveling. As shown in FIG. 7, when the steering angle is changed by the autonomous driving control, the following occurs. When the steering wheel 4 is maintained so as to cause the change amount of the steering angle to be smaller, there is a possibility that the deviation Δθ become equal to or more than the predetermined difference Δθ1 or become equal to or less than the predetermined difference Δθ2.

Meanwhile, the intervention operation determination apparatus in the embodiment of the present disclosure determines an intervention operation in a situation in which the steering torque of the steering wheel 4 by the driver becomes greater. Therefore, it is preferred to reduce cases in which a sudden change of the target steering angle or the maintenance of the steering wheel 4 is erroneously determined as an intervention operation at the time of autonomous driving traveling as above. In other words, the intervention operation determination apparatus is configured to determine the operation of the steering wheel 4 in which the direction of the target steering angle with respect to the actual steering angle (a reference steering angle θb) a predetermined amount of time before and the direction of the current actual steering angle with respect to the reference steering angle are opposite directions as an intervention operation.

Figure 8:
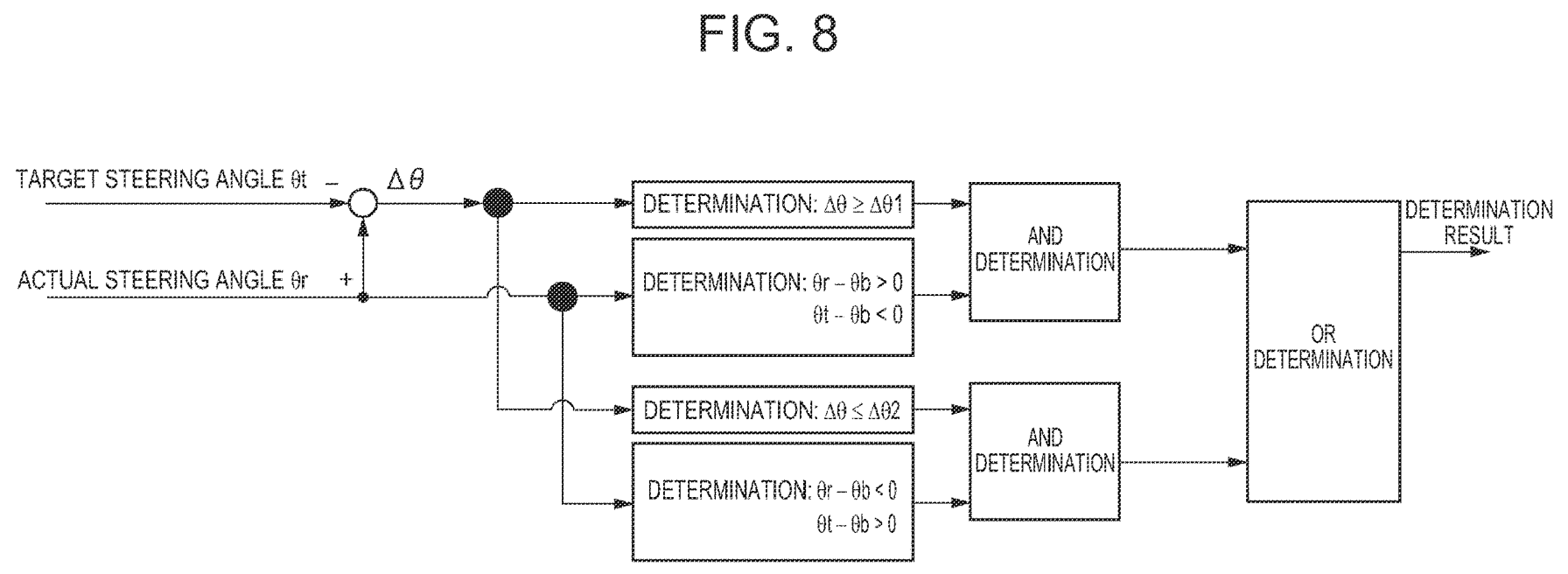

Therefore, in order to reduce cases in which it is erroneously determined that there has been an intervention operation when the steering wheel 4 is not operated or is maintained, the quick steering determination unit 22 may be configured to determine that there has been an intervention operation when the deviation Δθ is equal to or more than the predetermined difference Δθ1, the value obtained by subtracting the reference steering angle θb from the actual steering angle θr is a positive value, and the value obtained by subtracting the reference steering angle θb from the target steering angle θt is a negative value, or the deviation Δθ is equal to or less than the predetermined difference Δθ2, the value obtained by subtracting the reference steering angle θb from the actual steering angle θr is a negative value, and the value obtained by subtracting the reference steering angle θb from the target steering angle θt is a positive value as shown in FIG. 8. It becomes possible to determine that there is an intervention operation only when the driver intentionally rotates the steering wheel 4 and reduce erroneous determination as described above by determining the intervention operation based on the directions of the target steering angle and the actual steering angle as above.

Figure 9:
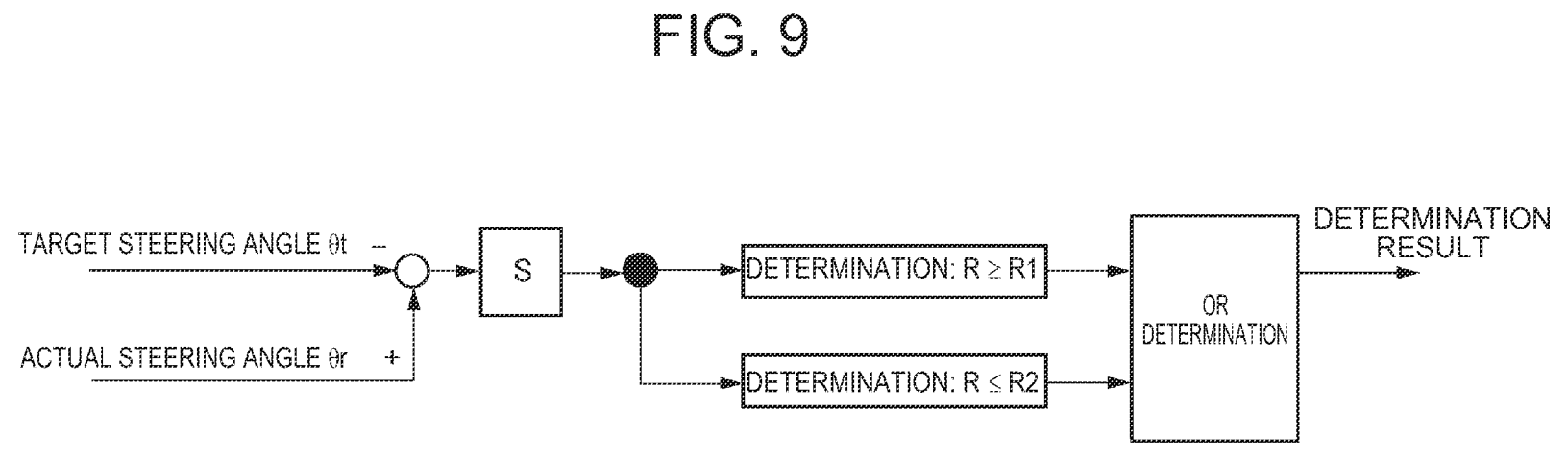
Figure 10:
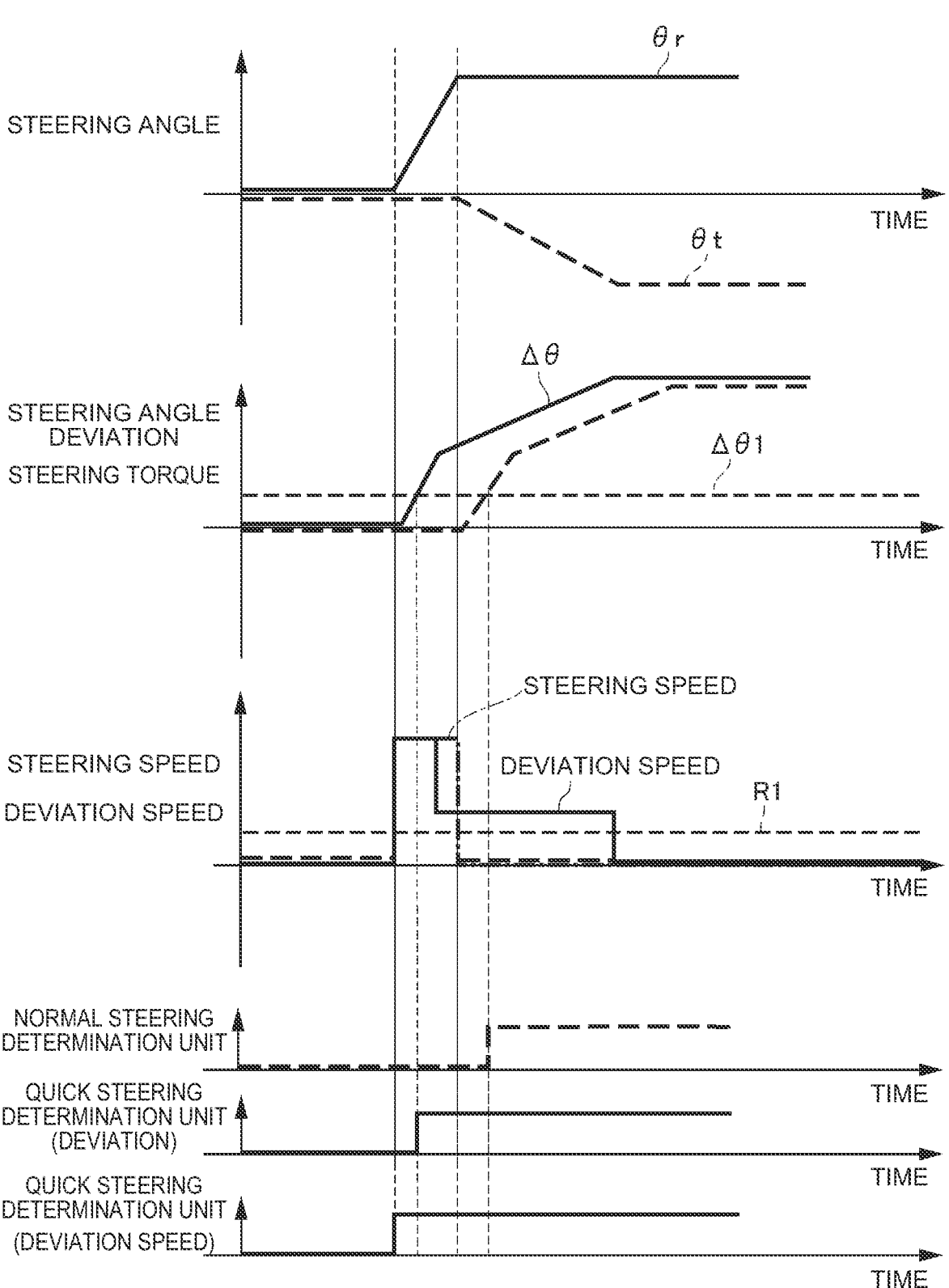
FIG. 10 is a time chart showing changes in the actual steering angle, the target steering angle, the steering angle deviation, the steering torque, the steering speed, the deviation speed, whether there is determination by the normal steering determination unit, whether there is determination by the quick steering determination unit based on the deviation, and whether there is determination by the quick steering determination unit based on the deviation speed in a case in which the steering wheel is operated in the left turning direction at the time of straight traveling by autonomous driving.

The quick steering determination unit 22 may determine that there is an intervention operation when a change rate (or a change speed) R of the deviation Δθ is equal to or more than a predetermined change rate R1 or equal to or less than a predetermined change rate R2 as shown in FIG. 9. FIG. 10 shows the change speed (steering speed) of the actual steering angle θr and the change speed of the deviation Δθ when the steering wheel 4 is operated as with FIG. 5. As shown in FIG. 10, it becomes possible to determine an intervention operation at a time point at which the operation of the steering wheel 4 starts by determining the intervention operation based on the change rate R (broken line) of the deviation Δθ. As a result, it becomes possible to determine an intervention operation in an even earlier stage than a case in which it is determined that there is an intervention operation when the deviation Δθ is equal to or more than the predetermined difference Δθ1 or is equal to or less than the predetermined difference Δ62.

The change rate R of the deviation Δθ may be obtained by differentiating the deviation Δθ with respect to time or may be obtained by dividing a difference between the deviation Δθ (previous value) obtained in a previous control routine and the deviation Δθ (current value) obtained by the current control routine by a control cycle time. In other words, the control cycle is fixed, and hence it may be determined whether there is an intervention operation based on the difference of the deviation Δθ for each control routine instead of the change rate of the deviation Δθ. Similarly, the change rate in the description below is not limited to a value obtained by time differentiation.

Figure 11:
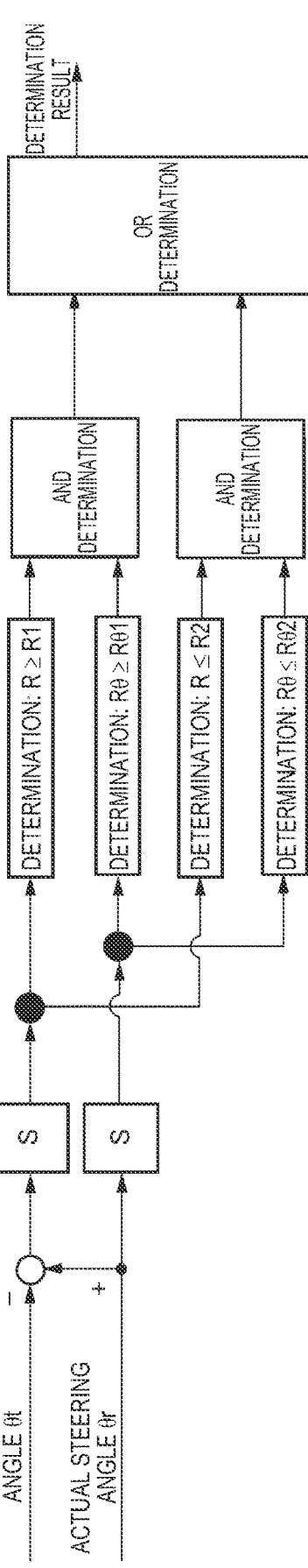
FIG. 11 is a block line diagram showing one example of a configuration that determines an intervention operation based on the change rate of the deviation between the actual operation angle and the target steering angle and a change rate of the actual steering angle.

Even when an intervention operation is determined based on the change rate R of the deviation Δθ as described above, there is a possibility that it be erroneously determined that there has been an intervention operation when the steering wheel 4 is not operated or is maintained as with above. Therefore, in the intervention operation determination apparatus in the embodiment of the present disclosure, it may be determined that there has been an intervention operation by the driver when the change rate R of the deviation Δθ is equal to or more than the predetermined change rate R1 and a change rate Rθ of the steering angle θ is equal to or more than a predetermined change rate Rθ1 or the change rate R of the deviation Δθ is equal to or less than the predetermined rate R2 and the change rate Rθ of the steering angle θ is equal to or less than a predetermined change rate Rθ2 as shown in FIG. 11. The predetermined change rate Rθ1 may be set to a positive value, and the predetermined change rate Rθ2 may be set to a negative value.

By determining whether there is an intervention operation based on the change rate Rθ of the steering angle θ in addition to the change rate R of the deviation Δθ as above, it becomes possible to reduce the occurrence of an erroneous determination indicating that there is an intervention operation when the driver is not performing the operation of rotating the steering wheel 4 in addition to determining an intervention operation in an early stage.

Figure 12:
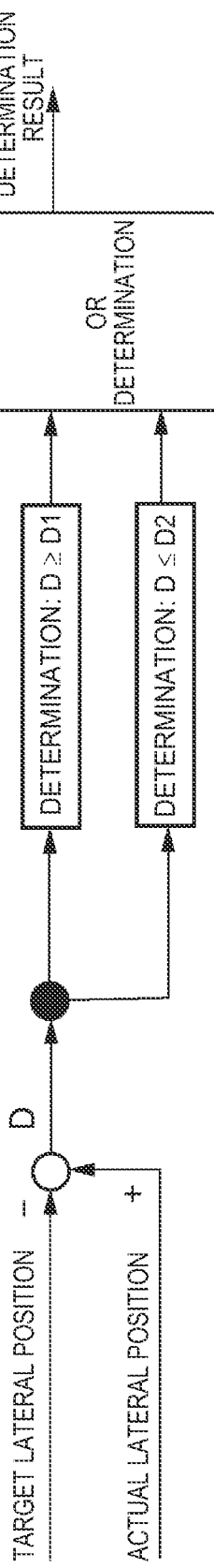
FIG. 12 is a block line diagram showing one example of a configuration that determines an intervention operation based on a difference between a target lateral position and an actual lateral position.

The intervention operation determination apparatus in the embodiment of the present disclosure is not limited to determining an intervention operation based on the steering angle and may determine an intervention operation based on the position of the vehicle 2. FIG. 12 is a functional block diagram for describing an example of determining an intervention operation based on the position of the vehicle 2. In the example shown in FIG. 12, first, a difference (lateral deviation) D between a target lateral position on a traveling route defined by the autonomous driving control and a current lateral position (actual lateral position) of the vehicle 2 obtained by a camera, map information, and the like is obtained. It is determined that there has been an intervention operation when the lateral deviation D is equal to or more than a predetermined difference D1 or is equal to or less than a predetermined difference D2, in other words, an absolute value of the lateral deviation D is equal to or more than a predetermined difference. Here, the left direction in the map information is the positive value.

Figure 13:
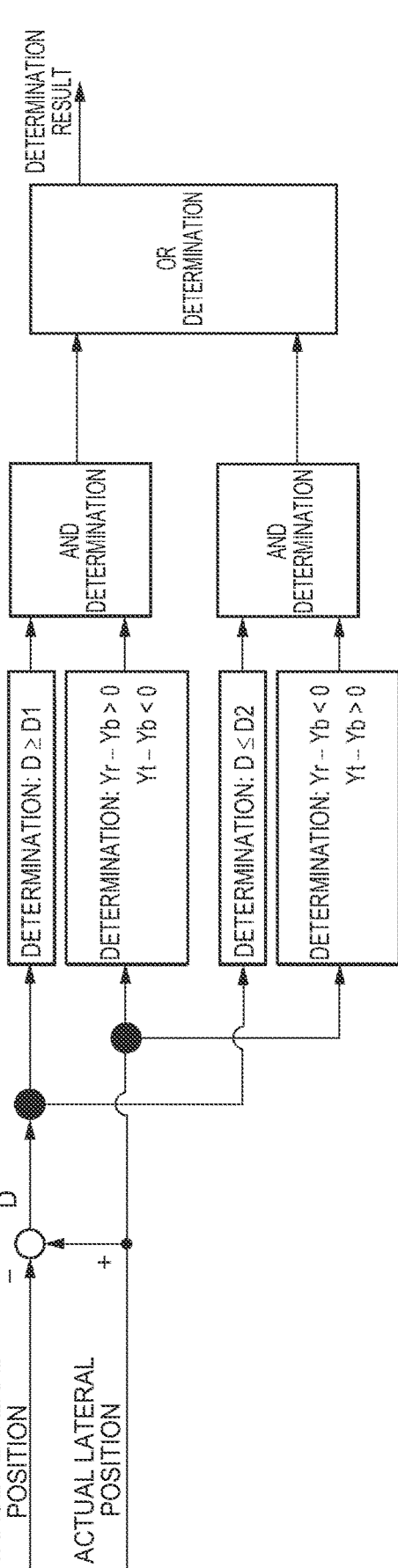
FIG. 13 is a block line diagram showing one example of a configuration that determines an intervention operation based on the difference between the target lateral position and the actual lateral position and directions of a target yaw angle and an actual yaw angle.

As with the method of determining an intervention operation in accordance with the steering angle described above, cases in which it is erroneously determined that there has been an intervention operation when the steering wheel 4 is not operated or is maintained are reduced. In other words, it may be determined that there is an intervention operation when the absolute value of the lateral deviation D is equal to or more than a predetermined difference, and the direction of a target yaw angle Yt with respect to an actual yaw angle (reference yaw angle Yb) a predetermined amount of time before and the direction of an current actual yaw angle (actual yaw angle) Yr with respect to the reference yaw angle Yb are opposite directions. Specifically, as shown in FIG. 13, it may be determined that there has been an intervention operation when the lateral deviation D is equal to or more than the predetermined difference D1, the value obtained by subtracting the reference yaw angle Yb from the actual yaw angle Yr is a positive value, and the value obtained by subtracting the reference yaw angle Yb from the target yaw angle Yt is a negative value or when the lateral deviation D is equal to or less than the predetermined deviation D2, the value obtained by subtracting the reference yaw angle Yb from the actual yaw angle Yr is a negative value, and the value obtained by subtracting the reference yaw angle Yb from the target yaw angle Yt is a positive value.

Figure 14:
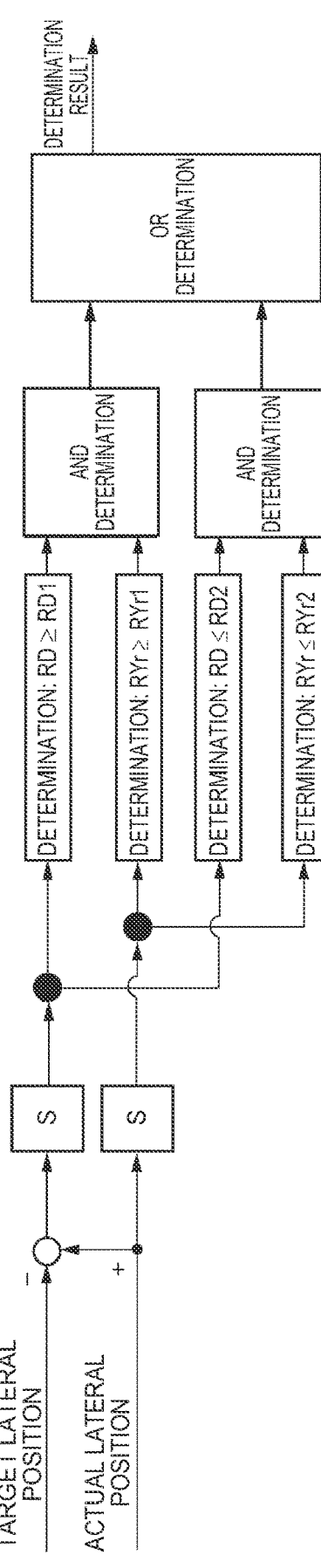
FIG. 14 is a block line diagram showing one example of a configuration that determines an intervention operation based on a change rate of the difference between the target lateral position and the actual lateral position and a change rate of the actual lateral position.

It may be determined that there has been an intervention operation when a change rate RD of the lateral deviation D is equal to or more than a predetermined change rate RD1 and a change rate RYr of the actual yaw angle Yr is equal to or more than a predetermined change rate RYr1 or when the change rate RD of the lateral deviation D is equal to or less than a predetermined change rate RD2 and the change rate RYr of the actual yaw angle Yr is equal to or less than a predetermined change rate RYr2 as shown in FIG. 14.

It becomes possible to determine an intervention operation in an early stage when the steering wheel 4 is operated at a relatively high speed by determining whether there is an intervention operation based on the lateral position of the vehicle 2 as described above. It becomes possible to reduce cases in which erroneous determination indicating that there is an intervention operation occurs when the driver is not performing the operation of rotating the steering wheel 4 by determining the intervention operation based on the actual yaw angle Yr in addition to the lateral deviation D. It becomes possible to immediately determine an intervention operation after the operation of the steering wheel 4 and determine an intervention operation in an even earlier stage by determining whether there is an intervention operation based on the change rate RD of the lateral deviation D.

The steering apparatus described above is not limited to the configuration shown in FIG. 1 and may have a so-called steer-by-wire configuration in which the steering wheel 4 and the steering wheel 3 are not mechanically joined to each other. In the example described above, in the vehicle 2 capable of setting the first mode that performs the autonomous driving traveling in which the driver does not operate the steering wheel 4 and the second mode in which the driver can operate, as appropriate, the steering wheel 4 at the time of autonomous driving traveling, switching is performed to the second mode when there has been an intervention operation at the time of traveling in the first mode. However, switching may be performed between the autonomous driving traveling and manual driving traveling.

In the present disclosure, the steering unit with which steering is performed may be a control stick (a steering stick or a joystick) instead of the steering wheel described above. In this case, the control stick is not rotated but is tilted to the left and the right, and hence the actual steering angle in the embodiment described above only needs to be treated as an actual tilting angle. Therefore, the rudder angle in the present disclosure includes an angle to be tilted. In the embodiment described above, it is described that the rudder angle in the left direction is a "positive" angle and the rudder angle in the right direction is a "negative" angle, but those "positive" and "negative" may be opposite from the embodiment described above or an absolute value may be employed without making a distinction in accordance with "positive" and "negative".

What is claimed is:

1. An intervention operation determination apparatus, comprising:

a steering unit operated by a driver;

a steering wheel to be turned in conjunction with the operation of the steering unit;

a rudder angle sensor that detects an operation amount of the steering unit when a steering force that turns the steering wheel is generated, the intervention operation determination apparatus determining that the driver has operated the steering unit during autonomous driving in which traveling by controlling an actuator without an operation of the steering unit by the driver is performed; and a controller that controls the actuator, wherein the controller determines that there has been an intervention operation in which the driver operates the steering unit based on a deviation between a target steering angle in the autonomous driving and an actual steering angle based on an operation amount detected by the rudder angle sensor, and the controller is configured to calculate a target steering torque, wherein:

the target steering torque is calculated based on a first feedback gain as a result of a first mode being selected, the target steering torque is calculated based on a second feedback gain as a result of a second mode being selected, the target steering torque is calculated based on multiplying the deviation by the first feedback gain or the second feedback gain, and the first feedback gain is greater than the second feedback gain.

2. The intervention operation determination apparatus according to claim 1, wherein the controller determines that there has been the intervention operation when an absolute value of the deviation is equal to or more than a predetermined difference.

3. The intervention operation determination apparatus according to claim 2, wherein the controller determines that there has been the intervention operation when a direction of the target steering angle with respect to a reference steering angle set in advance and a direction of the actual steering angle with respect to the reference steering angle are opposite directions.

4. The intervention operation determination apparatus according to claim 1, wherein the controller determines that there has been the intervention operation when a change rate of the deviation is equal to or more than a predetermined change rate.

5. The intervention operation determination apparatus according to claim 1, wherein the controller is configured to calculate a reaction torque, wherein:

the reaction torque is calculated based on a first gain as a result of the first mode being selected, the reaction torque is calculated based on a second gain as a result of the second mode being selected, the reaction torque is calculated based on multiplying the first gain or the second gain by a steering torque detected by a torque sensor, and the first gain is greater than the second gain.

6. The intervention operation determination apparatus according to claim 5, wherein:

in the first mode, the intervention operation determination apparatus is configured to not expect the driver to operate the steering unit during autonomous driving, and in the second mode, the intervention operation determination apparatus is configured to expect the driver to operate the steering unit during autonomous driving.

7. An intervention operation determination apparatus, comprising:

a steering unit operated by a driver;

a steering wheel to be turned in conjunction with the operation of the steering unit;

an actuator that generates a steering force that turns the steering wheel, the intervention operation determination apparatus determining that the driver has operated the steering unit during autonomous driving in which traveling by controlling the actuator without an operation of the steering unit by the driver is performed; and a controller that controls the actuator, wherein the controller determines that there has been an intervention operation in which the steering unit is operated based on a deviation between a target lateral position in the autonomous driving and an actual lateral position, and the controller is configured to calculate a target steering torque, wherein:

the target steering torque is calculated based on a first feedback gain as a result of a first mode being selected, the target steering torque is calculated based on a second feedback gain as a result of a second mode being selected, the target steering torque is calculated based on multiplying the first feedback gain or the second feedback gain by a deviation between a target steering angle in the autonomous driving and an actual steering angle based on an operation amount detected by an rudder angle sensor, and the first feedback gain is greater than the second feedback gain.

8. The intervention operation determination apparatus according to claim 7, wherein the controller determines that there has been the intervention operation when an absolute value of the deviation between the target lateral position in the autonomous driving and the actual lateral position is equal to or more than a predetermined difference.

9. The intervention operation determination apparatus according to claim 8, wherein the controller determines that there has been the intervention operation when a direction of a yaw angle based on the target lateral position with respect to a reference yaw angle set in advance and a direction of an actual yaw angle with respect to the reference yaw angle are opposite directions.

10. The intervention operation determination apparatus according to claim 7, wherein the controller determines that there has been the intervention operation when a change rate of the deviation between the target lateral position in the autonomous driving and the actual lateral position is equal to or more than a predetermined change rate.

11. The intervention operation determination apparatus according to claim 7, wherein the controller is configured to calculate a reaction torque, wherein:

the reaction torque is calculated based on a first gain as a result of the first mode being selected, the reaction torque is calculated based on a second gain as a result of the second mode being selected, the reaction torque is calculated based on multiplying the first gain or the second gain by a steering torque detected by a torque sensor, and the first gain is greater than the second gain.

12. The intervention operation determination apparatus according to claim 11, wherein:

in the first mode, the intervention operation determination apparatus is configured to not expect the driver to operate the steering unit during autonomous driving, and in the second mode, the intervention operation determination apparatus is configured to expect the driver to operate the steering unit during autonomous driving.

* * * * *